UNITED STATES PATENT OFFICE 2,410,357

PAPER SIZING

Donald K. Pattilloch, Springfield, Mass., assignor of one-half to Chemical Development, Inc., Chicago, Ill., a corporation of Illinois, and one-half to George B. Fowler, Springfield, Mass.

No Drawing. Application June 20, 1942,
Serial No. 447,774

9 Claims. (Cl. 106—79)

The present invention relates to an improved form of paper sizing material, particularly of the type which is precipitable in a paper beater by means of paper maker's alum and which, by reason of its constitution, presents many advantages over the materials hitherto employed for this purpose.

Broadly speaking, the present invention primarily concerns a paper-sizing material which may be furnished, if desired, in dry powdered form, or may be supplied in the form of a solution or dispersion, and which comprises, among its essential components, a cereal flour, some form of rosin or rosin size, and an alkali silicate having an $M_2O$ to $SiO_2$ ratio of at least 1:1, which silicate is exemplified by the group consisting of the metasilicates and sequisilicates.

The invention furthermore involves the method of sizing paper while at the same time enhancing the chemical hydration effect by the conjoint precipitation onto the paper fibers, while suspended in water, of some form of rosin size as well as starch and the vegetable proteins of cereal flour.

The invention further includes methods for the preparation of the sizing material of the present invention, all as will be described in greater detail hereinbelow, from which description the further objects of the invention will become manifest.

It has already been proposed in the past to precipitate various forms of starch or starchy materials onto paper fibers, either in the beater or in the subsequent stages of paper manufacture, as for example by placing some form of gelated starch in the beater and, after the dilution of the thus resulting furnish, precipitating the starch by the production in the furnish, at a suitable point in the process, of a positively charged precipitate derived from, for example, sodium aluminate and aluminum sulfate or from sodium metasilicate and aluminum sulfate. Moreover, the present applicant in his joint application with George B. Fowler, Serial No. 412,691, filed September 27, 1941, now Patent No. 2,326,849, has described the preparation of certain types of rosin-containing starch gels produced by the action of an alkali silicate having an $M_2O$ to $SiO_2$ ratio of at least 1:1, namely such silicates as sodium metasilicate and sodium sequisilicate, on various starches and rosin.

Applicant has now found that for some purposes improved and more desirable results are obtained by substituting for the relatively pure starches, the commercial cereal flours which contain, in addition to the starch, the various types of proteins, glutens, and the like. It was found that particularly when making some of the cheaper papers, box board, card board and the like, not only could the sizing be effected at less expense, but also that certain desirable properties, such as enhanced waterproofness, were imparted to these types of paper products, when ordinary flour was substituted for the starch described in the aforementioned previous applications. It seems that the various types of flour contain a percentage of protein which varies between 9 and 18%, and this protein, while in most cases insoluble in water, is found to be soluble in alkaline reacting materials such as the silicates used in connection with the present invention. These are exemplified by the so-called prolamines (gliadins) which are present in wheat, while the protein in barley is known as hordein, and that in corn is known as zein. The invention contemplates the use of any of the cereal flours, such as those derived from wheat, corn, oats, potatoes, soy beans and the like. For most purposes inexpensive products such as corn flour, wheat flour, wheat flour middlings, and shipstuff may be employed, particularly when the paper is of a low grade where color is no particular consideration.

It has been found that cereal flours when gelated by the use of the types of silicates indicated, are converted into a particularly easily precipitable state when a gel thereof is permitted to react with an acid reacting precipitant such, for example, as aluminum sulfate, iron sulfate, aluminum chloride, iron chloride, and the like, whereby a complex precipitate is obtained which throws down the starch and the proteins contained in the flour and causes these substances to adhere to the paper fibers, thereby endowing them with a greater degree of slowness on the paper machine, or as it is sometimes called, increasing the hydration effect.

The present invention is to be distinguished from the prior proposals of others, as well as from applicant's work exemplified by the aforementioned applications for letters patent, in that it has now been found that very superior results, both as to sizing as well as starch precipitation, can be obtained by employing a mixture of an alkali silicate such as metasilicate or sesquisilicate with either rosin size or preferentially raw rosin, whereby the rosin is either saponified or at least is aqueously dispersed, while at the same time the starch in the cereal flour is gelated, and the protein therein brought into solution. Thus, for example, the process may be carried out by dissolving sodium metasilicate in water and then dispersing into the resulting solution some form of rosin or rosin size in a state of uniform comminution whereby the rosin becomes partly saponified or at any rate uniformly and finely dispersed in the metasilicate solution. The resulting mixture may then be employed for gelating the cereal flour in the cold which may be accomplished for example by stirring the flour into the solution or else by suspending the flour separately in water and effecting a commingling of the flour suspension with the rosin metasilicate suspension.

By choosing the proper proportions, as will hereinafter be set forth in greater detail, there will result a gelation or swelling of the starch content of the cereal flour with a resulting rupturing of the amylo-cellulose membranes surrounding the individual starch grains, so that the amylose of the starch itself will combine with the water, while at the same time the prolamines or vegetable proteins will likewise become dissolved or dispersed. It will be apparent that by virtue of the already existing even distribution of the rosin, these rosin particles, of submicroscopic size, will orient themselves on or about the individual starch and/or protein micelles thus producing a colloidal complex, the exact nature of which is difficult to explain. However, if such a rosin metasilicate cereal flour complex is added to a beater containing paper fibers and is precipitated therein by means of an adequate quantity of an acid reacting salt, for example aluminum sulfate, a series of complex reactions will take place whereby not only will the size be precipitated, but the starch and vegetable proteins will be rendered substantially insoluble and caused to adhere together with the size to the suspended paper fibers. The result is not only an excellent sizing of the paper but also the production of the desired hydration effect, all in one single operation. The advantage of this will, of course, be immediately apparent to the experienced paper maker. The aforementioned example, however, by no means exhausts the ramifications and possibilities of the invention.

Another and very advantageous method of proceeding is to produce a dry mixture of an ordinary cereal flour, sodium metasilicate pentahydrate, which is a dry free flowing substance, and ordinary powdered rosin, the so-called gum rosin or wood rosin of commerce. The so-called "K" grade is particularly suitable. Suitable proportions may be as follows:

*Formula 1*

| | Parts |
|---|---|
| Cereal flour | 40 |
| Powdered rosin | 20 |
| Granular or powdered sodium metasilicate | 30–40 |

*Formula 2*

| | Parts |
|---|---|
| Cereal flour | 40 |
| Dry rosin size (of commerce) | 15–25 |
| Granular or powdered sodium metasilicate | 30 |

*Formula 3*

| | Part |
|---|---|
| Cereal flour | 1 |
| Powdered ordinary rosin | 1 |
| Granular or powdered sodium metasilicate | 1 |

In the above formulas all of the parts are by weight.

In order to avoid the necessity of circumlocution, it may be stated at this point that sodium sesquisilicate, which has a ratio of $Na_2O$ to $SiO_2$ of 1.5:1, may be substituted for the sodium metasilicate, using such an amount of sodium sesquisilicate as will be equivalent in $Na_2O$ content to the sodium metasilicate. In all of the discussion hereinafter, as well as in the claims, it is to be understood that when metasilicate is mentioned the applicant reserves the right to the doctrine of equivalents to cover the sesquisilicate as well as mixtures of the metasilicate with the sesquisilicate.

It might be pointed out in passing that there is a fundamental and important difference between the ordinary silicate sirups of commerce and the silicates employed by the present applicant. Silicate sirups without exception contain a greater molar ratio of silicon dioxide to sodium oxide than do the silicates employed by the applicant. The silicate sirups moreover are insufficiently alkaline themselves to gelate the cereal flour in the cold, irrespective of the amounts of such silicates which may be permitted to act upon the cereal flour. Thus, for example, the ionization of these sodium silicate solutions, so far as the hydroxyl ion is concerned, is greatly inferior to that of either the metasilicate or sesquisilicate, so that the silicate sirups may be said to have an insufficient alkalinity to effect the gelation of the cereal flour in the cold.

As an exemplification of another method of carrying out the present invention, a modified form of rosin size may be prepared, for example by partially saponifying rosin, either in the cold or in a heated condition, by means of an aqueous solution of sodium metasilicate or sodium sesquisilicate, thus producing what might be called, for the purposes of the present discussion, a metasilicated rosin size, using for this purpose a sufficient excess of the metasilicate or sesquisilicate so that the mixture will be sufficiently alkaline to gelate cereal flour which comes in contact with it. Into such a metasilicated rosin size solution one may introduce either dry cereal flour or a batter of cereal flour produced by suspending said flour in a sufficient quantity of water, the mixture then being stirred until the desired gelation of the starchy components of the flour and the solution of the prolamines has taken place. As to the proportions, the amounts mentioned in connection with the dry mixtures of Formulas 1, 2 and 3 will be effective, without, however, changing the relative amounts to be dissolved in water.

As a more detailed example, one may suspend 40 parts of cereal flour and 20 parts of powdered rosin in 480 parts of water, all by weight, and then dissolve, say, 28 to 40 parts of sodium metasilicate in 120 parts of water and, when dissolved, commingle the two solutions by pouring one into the other or both of them into a third vessel, sufficient agitation being provided to cause a rapid and uniform admixture of the materials. Under these conditions, the metasilicate will disperse the size, as this reaction is fairly rapid. The gelation of the starchy component of the cereal flour and the solution of prolamines then follows, the results hereinabove described thus being effected.

An alternative proceeding is to make a dry mixture of cereal flour and rosin and then to dissolve the required amount of sodium metasilicate in water, rapidly stirring the mixture of cereal flour and rosin into the water. By reason of the rapid wetting action which metasilicate solutions have, the cereal flour and rosin will be rapidly dispersed, followed by gelation of the flour in the same manner as already described. In other words, the precise order of addition is of no particular importance except that one thing is to be avoided: One cannot first gelate the cereal flour with the metasilicate and then hope adequately to disperse powdered rosin in the mixture, for the rosin will tend to ball up and form a lumpy mixture. However, if the metasilicate is first allowed to contact the rosin, so that this will be dispersed in the solution, the gelation can well follow as a subsequent step in the operation.

Still another method of practicing the present invention is to saponify or disperse rosin or rosin size in a metasilicate solution and then to spray-dry the mixture to obtain a dry powder which may then be mixed with cereal flour to form one modification of the product of the applicant's present invention.

From a commercial point of view, a dry mixture constituted substantially in conformance with Formulas 1, 2 and 3, or a reasonable modification thereof, is the preferred embodiment, as it forms a material which can be sold to paper manufacturers with simple directions for dissolving it in an adequate amount of water, namely, in the proportion of from 400 to 700 parts by weight of water to 100 parts of the mixture.

As a further guide to adequate proportioning, it may be stated that the amount of water should be approximately fifteen times the weight of the starch content of the composition. The amount of sodium metasilicate, using in this case the dry granular pentahydrate as a basis for calculations, should be approximately in the ratio of 4 parts of flour to from 2.5 to 4 parts of sodium metasilicate. In any event, a sufficient quantity of metasilicate should be employed to obtain gelation of the flour within a period of, say, not exceeding a half hour.

The cereal flours employed in the present invention may be any of those commercially available, although wheat flour, particularly the cheaper commercial grades, are to be preferred, if for no other reason than on account of their cost, and the fact that they do not abstract from the food supply for which they are usually unsuitable. The parts by weight mentioned are predicated upon ordinary air-dry cereal flour.

The rosin or rosin size may be any form of this commodity which is available on the market. Thus it may be that type known as gum rosin, or it may be wood rosin or various types of colophony procurable from dealers in naval stores, or it may be dry or wet commercial so-called rosin size, which is a partially saponified form of rosin. When using rosin in the dry form, it is preferable that it be finely powdered, say, 100 mesh or smaller. However, cooking the rosin with a sodium metasilicate solution may be resorted to, in which case the rosin need not be so finely divided. The rosin size, on the other hand, may be any commercial form of this commodity, thus even one containing a certain amount of wax. It may be the so-called dry rosin size which is usually the sodium salt of abietic acid, commonly containing a considerable excess of uncombined rosins and esters, or it may be in the form of a rosin size emulsion or rosin emulsion, all of which are commercial forms obtainable on the market. It will be evident, however, that where dry materials are given in the formulas, some form of dry rosin or dry rosin size will have to be employed. However, if the invention is practiced in the wet manner, the wet or liquid commercial forms of rosin size may be employed.

The alkali silicates employed are those from the group consisting of the metasilicates and the sesquisilicates but, by reason of cost, are practically restricted to the sodium salts, although of course the invention may be practiced with the corresponding potassium salts, which, however, because of expense, are probably not the most desirable.

The amount of alum or aluminum sulfate required for effecting the precipitation can readily be calculated by those familiar with paper-making technique, but it may be stated that sufficient alum or aluminum sulfate should be employed to produce a condition of acidity in the beater corresponding to a pH of anywhere between 4.2 and 5.8. Under these conditions it will be found unnecessary to employ a secondary coagulation process or subsequent pH control, as has sometimes been practiced by the applicant as well as by others, because the action of the aluminum sulfate on the material of the present invention produces a sufficiently complete precipitation of both the rosin and the flour to obviate the necessity for such control or secondary coagulation. Acid reacting salts which are the equivalent of aluminum sulfate may be used in place of the alum. Examples are iron (ic) sulfate and chloride.

Saving for himself such equivalents as will occur to those skilled in the art to which this invention appertains, the applicant claims:

1. A precipitable sizing material comprising a mixture of substantial quantities each of a protein-containing cereal flour, rosin and an alkali silicate from the group consisting of metasilicate and sesquisilicate.

2. A precipitable sizing material comprising a mixture of substantial quantities each of a protein-containing cereal flour, rosin size and an alkali silicate from the group consisting of metasilicate and sesquisilicate.

3. A precipitable sizing material comprising a dry mixture of about 40 parts by weight of a protein-containing cereal flour, 20 parts by weight of rosin, and 40 parts by weight of sodium metasilicate pentahydrate.

4. A precipitable sizing material comprising a dry mixture of about 40 parts by weight of a protein-containing cereal flour, 20 parts by weight of dry rosin size, and about 30 parts by weight of sodium metasilicate pentahydrate.

5. A precipitable sizing material comprising substantially equal parts by weight of a protein-containing cereal flour, rosin size and sodium metasilicate.

6. Process of producing a precipitable paper-sizing material which comprises simultaneously saponifying a substantial quantity of rosin and gelating a substantial quantity of a protein-containing cereal flour in an aqueous medium by means of a sufficient amount of an alkali silicate from the group consisting of metasilicates and sesquisilicates.

7. Process of producing a precipitable paper-sizing material which comprises saponifying rosin by means of a sufficient excess of sodium metasilicate so as to obtain an alkaline reacting rosin dispersion capable of gelating a cereal flour in the cold, and gelating a protein-containing cereal flour therewith.

8. Process of producing a precipitable paper-sizing material which comprises gelating a protein-containing cereal flour in the cold in an aqueous medium by means of an alkali-metasilicate-saponified rosin size.

9. Process of producing a precipitable paper-sizing material which comprises suspending rosin and a protein-containing cereal flour in the cold in an aqueous solution of an alkali silicate from the group consisting of metasilicate and sesquisilicate until the cereal flour has been gelated and the rosin dispersed.

DONALD K. PATTILLOCH.